United States Patent
Wulf

(10) Patent No.: US 10,139,007 B1
(45) Date of Patent: Nov. 27, 2018

(54) MATERIAL SPREADER APPARATUS FOR A HELICOPTER

(71) Applicant: Brent Wulf, Omaha, NE (US)

(72) Inventor: Brent Wulf, Omaha, NE (US)

(*) Notice: Subject to any disclaimer, the term of this patent is extended or adjusted under 35 U.S.C. 154(b) by 19 days.

(21) Appl. No.: 15/392,520

(22) Filed: Dec. 28, 2016

(51) Int. Cl.
| | |
|---|---|
| *F16K 31/02* | (2006.01) |
| *B65G 31/04* | (2006.01) |
| *B65D 88/28* | (2006.01) |
| *F16K 1/38* | (2006.01) |
| *B64D 1/16* | (2006.01) |
| *A01C 17/00* | (2006.01) |

(52) U.S. Cl.
CPC ............ *F16K 31/02* (2013.01); *A01C 17/001* (2013.01); *B64D 1/16* (2013.01); *B65D 88/28* (2013.01); *B65G 31/04* (2013.01); *F16K 1/38* (2013.01)

(58) Field of Classification Search
CPC ......... F16K 31/02; F16K 1/38; A01C 17/001; A01C 23/005; A01C 17/006; A01C 17/008; B64D 1/16; B65D 88/28; B65D 88/26; B65G 31/04; B67D 3/00; B67D 7/08; B05C 5/00; B05C 11/00
USPC ................... 239/171, 665, 71; 222/192, 200, 222/460–462, 504, 565, 423, 610, 222/626–627, 163, 185.1, 303, 307–308, 222/368, 559; 118/300, 674; 251/125, 251/206; 137/625.28, 625.31, 625.33
See application file for complete search history.

(56) References Cited

U.S. PATENT DOCUMENTS

| | | | | |
|---|---|---|---|---|
| 2,603,388 A | * | 7/1952 | Bryant ................... | B65G 65/00 222/303 |
| 2,898,008 A | * | 8/1959 | Hillwick ................. | B64D 1/16 222/303 |
| 3,204,896 A | * | 9/1965 | Smith et al. ........... | A01C 17/00 244/136 |
| 3,210,085 A | * | 10/1965 | Rastak ................... | A01C 17/00 239/665 |
| 3,463,398 A | * | 8/1969 | Eason .................... | A01C 17/00 222/334 |
| 3,688,952 A | * | 9/1972 | Barlow ................... | B64D 1/16 222/333 |
| 6,082,405 A | * | 7/2000 | Qvarfordh ............... | F16K 1/54 137/625.33 |
| 6,431,521 B1 | * | 8/2002 | Jones ...................... | F16K 1/38 251/319 |
| 7,213,547 B2 | * | 5/2007 | Peliks ...................... | F01L 7/02 123/190.1 |
| 7,275,498 B2 | * | 10/2007 | Martin ..................... | A21C 9/04 118/13 |

(Continued)

FOREIGN PATENT DOCUMENTS

DE        4216010 A1    11/1993
DE   102010007794 A1   10/2011

*Primary Examiner* — Paul R Durand
*Assistant Examiner* — Andrew P Bainbridge
(74) *Attorney, Agent, or Firm* — Dennis L. Thomte; Thomte Patent Law Office LLC

(57) ABSTRACT

A material spreader which is suspended beneath an airborne helicopter and which includes a container for flowable materials such as seeds, fertilizers or chemicals. The container has a discharge opening formed in its lower end which has a vertically movable valve positioned therein. The valve is controlled by the pilot of the helicopter from within the cockpit of the helicopter so that the application rate of the material may be varied without the necessity of landing the helicopter.

2 Claims, 10 Drawing Sheets

(56) References Cited

U.S. PATENT DOCUMENTS

| | | | |
|---|---|---|---|
| 2002/0079379 A1* | 6/2002 | Cheung | B64D 1/16 239/171 |
| 2011/0233444 A1* | 9/2011 | Bachner | F16K 1/04 251/331 |
| 2012/0199064 A1* | 8/2012 | Foy | B64D 1/16 118/674 |

* cited by examiner

MATERIAL SPREADER APPARATUS FOR A HELICOPTER

BACKGROUND OF THE INVENTION

Field of the Invention

This invention relates to a flowable material spreader apparatus which may be suspended from a helicopter to spread flowable material such as seeds, fertilizers, insecticides, etc., onto a field or the like. More particularly, this invention relates to a spreader apparatus for suspension from a helicopter whereby the spreader rate of the flowable material being discharged from the spreader apparatus may be precisely controlled from the cockpit of the helicopter.

Description of the Related Art

Many types of devices have been previously provided wherein a flowable material spreader apparatus is suspended below a helicopter for spreading seeds, fertilizers, insecticides, etc., onto the land over which the helicopter traverses. The prior art devices normally include a material hopper or tank which is suspended beneath the helicopter by a cable or the like. The prior art spreader devices also include means to adjust the discharge rate of the flowable material from the discharge end of the material hopper or tank. However, to the best of Applicant's knowledge, none of the discharge rates of the prior art devices may be changed in flight from the cockpit of the helicopter. Those prior art devices require that the helicopter lower the material hopper onto the ground, while hovering above the ground, to enable a ground crew to adjust the discharge rate. In some cases, the helicopter must also land after lowering the material hopper onto the ground, so that the material discharge rate may be changed.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A material spreader is disclosed for use with a helicopter. The invention includes a container, having upper and lower ends, for containing flowable materials therein. The container is suspended beneath the helicopter while the helicopter is airborne. The container has a central discharge opening at its lower end through which the material may flow. A material spreader is carried by the container for spreading the material which flows through the circular opening at the lower end of the container. A motor is carried by the container for operating the material spreader.

The apparatus also includes a vertically disposed valve movably positioned in the discharge opening in the container with the valve being movable between an upper open position and a lower closed position. The valve closes the discharge opening when in its lower position. The discharge opening is open when the valve is in its upper position. A vertically disposed electrically operated actuator is positioned within the container and includes a body portion having an actuator rod which is movably mounted between extended and retracted positions. The actuator rod is operatively secured to the valve whereby the valve is in its upper position when the actuator rod is in its retracted position and whereby the valve is in its lower position when the actuator rod is in its extended position. A control is provided for electrically operating the actuator with the control being positioned within the cockpit whereby the pilot of the helicopter may open and close the valve from within the cockpit and position the valve in partially open positions to selectively vary the flow rate of the material from the discharge opening in the container. The control also includes means for indicating to the pilot the position of the valve.

It is therefore a principal object of the invention to provide a material spreader apparatus for a helicopter.

A further object of the invention is to provide a material spreader apparatus for a helicopter whereby the discharge rate of the material being discharged from the material spreader apparatus may be controlled remotely from the cockpit of the helicopter.

A further object of the invention is to provide an improved valve means for use with a material spreader apparatus for a helicopter.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
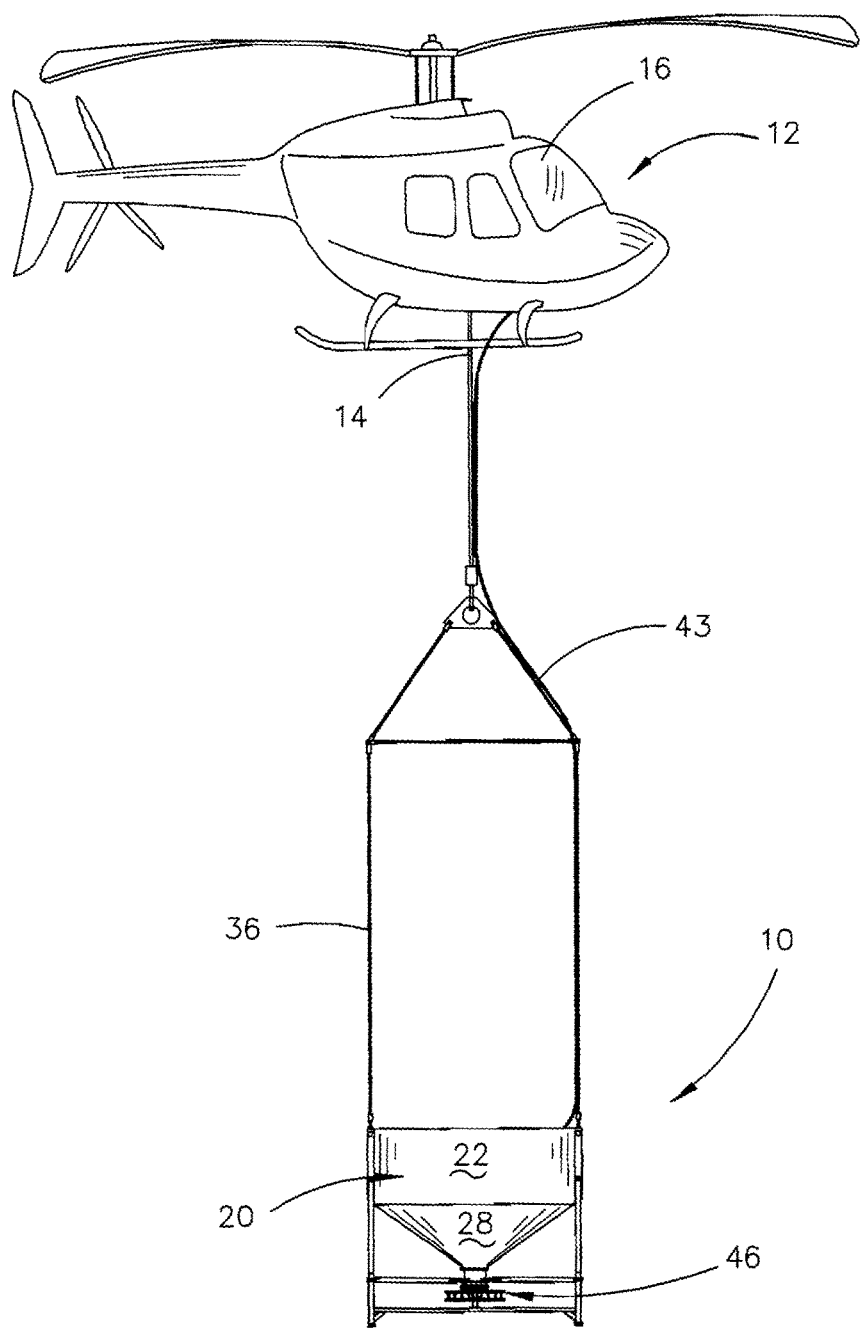
FIG. 1 is a view illustrating a helicopter having the material spreader apparatus of this invention suspended below the helicopter.
Figure 2:
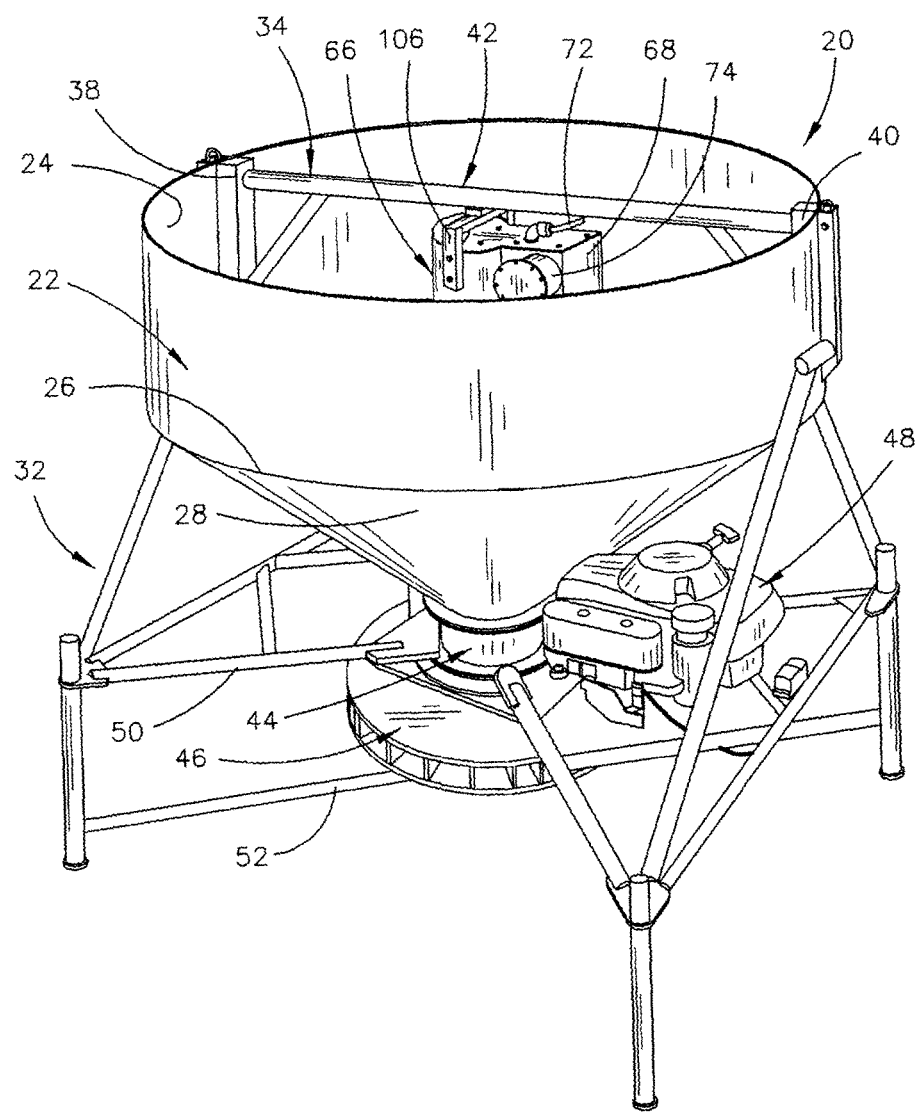
FIG. 2 is a perspective view illustrating the material spreader apparatus of this invention.
Figure 3:
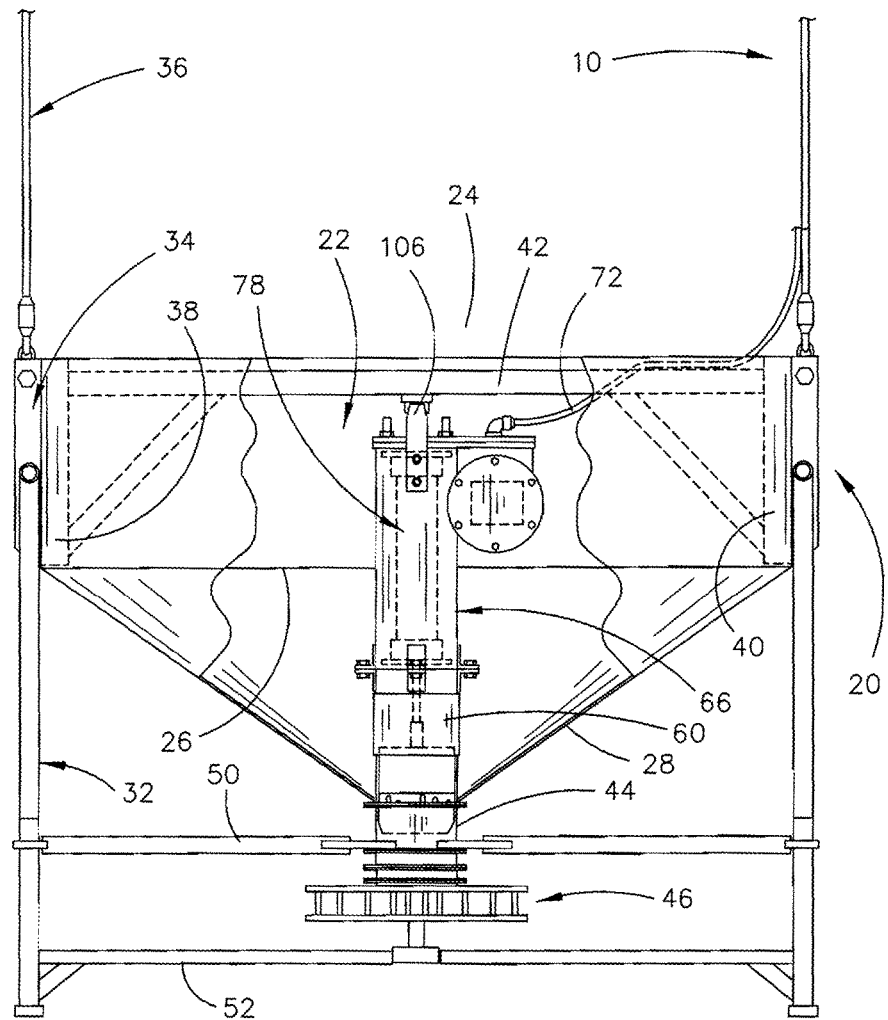
FIG. 3 is a side elevational view of the material spreader apparatus with portions cut-away to more fully illustrate the invention.
Figure 4:
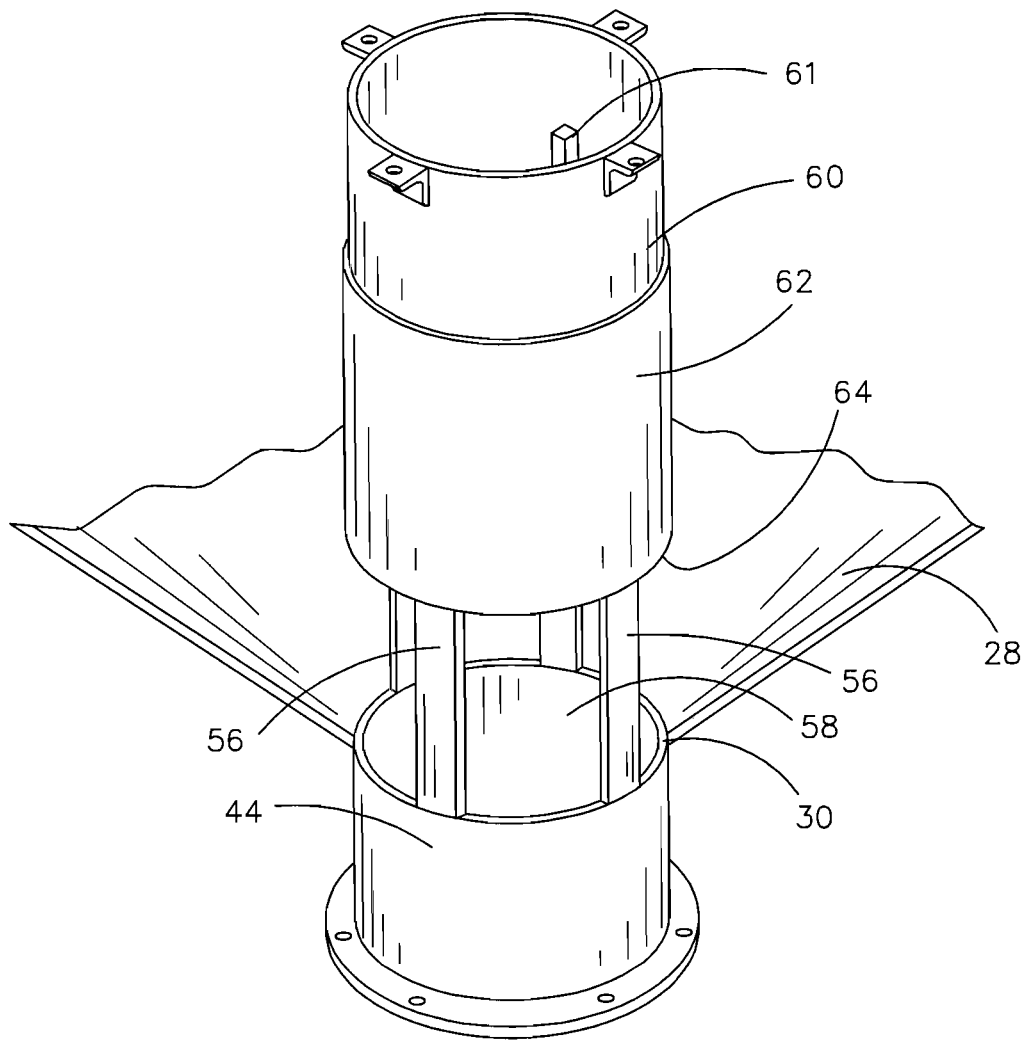
FIG. 4 is a partial perspective view which illustrates the support structure for the material dispensing valve member of the invention.
Figure 5:
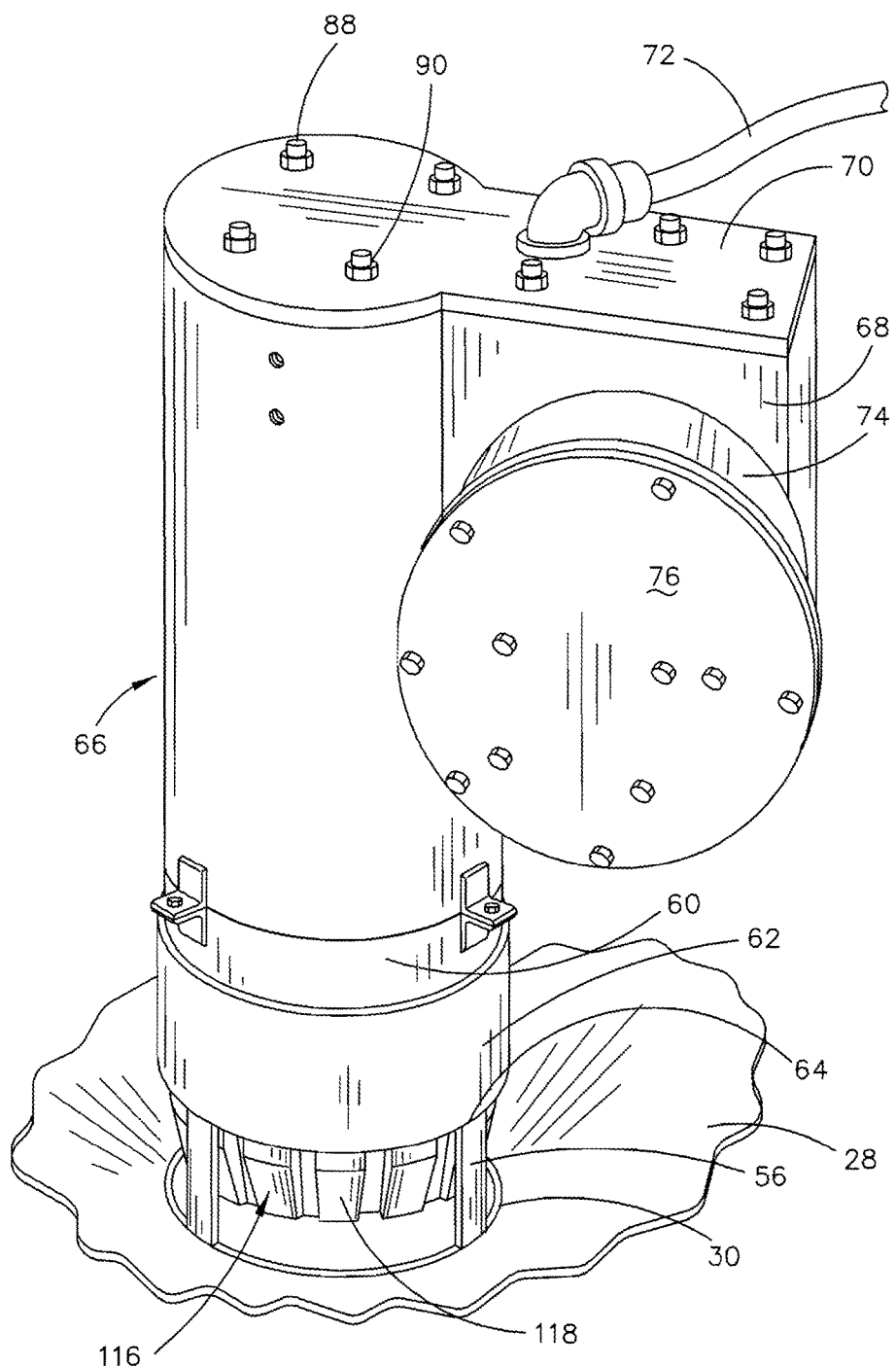
FIG. 5 is a partial perspective view illustrating a portion of the material dispensing valve member and its supporting structure.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The material spreader apparatus of this invention is referred to by the reference numeral 10. Spreader 10 is configured to be suspended beneath a helicopter 12 by a cable 14. Helicopter 12 includes a cockpit 16. Helicopter 12 includes a conventional 12 volt DC or 24 volt DC electrical system 17. The spreader 10 is conventional in many aspects but is designed so that the material discharge rate of the spreader 10 may be adjusted from the cockpit 16 of the helicopter 12.

Spreader 10 includes a hopper, container or tank 20 which includes a cylindrical portion 22 at its upper end which has an open upper end 24 and a lower end 26. Hopper 20 also includes a conical-shaped wall portion 28 which extends downwardly and inwardly from the lower end 26 of cylindrical portion 22. Wall portion 28 has a circular discharge opening 30 formed in its lower end. Spreader 10 includes a support structure 32 which enables the hopper 20 to be supported on the ground. Spreader 10 also includes a hanger structure 34 which is secured to hopper 20 to enable cable structure 36, which is secured thereto, for connection to the cable 14 to suspend the spreader 10 beneath the helicopter 12 when the helicopter 12 is airborne. Hanger structure 34 includes a pair of supports 38 and 40 which are secured to cylindrical portion 22 of hopper 20 at the inner side thereof. The numeral 42 refers to a horizontally disposed support bar which is secured to supports 38 and 40 and which extends therebetween. The cable structure 36 is connected to the hanger structure 34. Cable structure 36 also includes a yoke-shaped support 43 which is connected to the cable 14.

Spreader 10 includes a hollow tubular portion 44 which extends downwardly from the lower end of the conical-shaped wall portion 28. The upper end of tubular portion 44 is secured to the wall portion 28 so as to be in communication with the discharge opening 30. A conventional material spreader mechanism 46 is secured to the lower end of tubular portion 44 for spreading material outwardly from the spreader 10 in conventional fashion. Spreader mechanism 46 includes an engine 48 or hydraulic motor for rotating the spreader mechanism 46. Support structure 32 includes braces 50 which have their inner ends operatively secured to tubular portion 44. Support structure 32 also includes braces 52 which have their inner ends operatively secured to the material spreader mechanism 46.

A plurality of vertically disposed support bars or straps 56 have their lower ends secured to the upper end of tubular member 44 and extend upwardly therefrom in a spaced-apart manner to define openings 58 therebetween. The upper ends of bars 56 are secured to a vertically disposed tube 60. The interior of tube 60 has an anti-rotation bar 61 protruding inwardly therefrom. A sleeve or tube 62 embraces the lower end of tube 60 and the upper ends of bars 56. The lower end 64 of sleeve 62 is spaced above the discharge opening 30.

The upper end of tube 60 is secured to the lower end of a tube or housing 66. Tube 66 has a box-like housing 68 extending laterally from the side of tube 66. The lower end of housing 68 is closed. A cover 70 extends over the upper ends of tube 66 and housing 68 and is selectively removably secured thereto. An electrical cable 72 extends outwardly from cover 70 as will be described hereinafter. A tube 74 extends from housing 68 and is closed by a cover 76.

The numeral 78 refers to a vertically disposed actuator which is positioned in tube 66 and housing 68. Actuator 78 is conventional in design and includes a body portion 80 having a lower end 82. A control box 84 extends laterally from body portion 80 at the upper end thereof. When actuator 78 is positioned in tube 66, the control box 84 is positioned in housing 68. A mounting plate 86 is positioned at the upper end of body portion 80 and has a plurality of threaded studs 88 extending upwardly therefrom. Studs 88 extend through cover 70 and are secured thereto by nuts 90.

A mounting plate 92 is positioned at the lower end of body portion 80 and is connected to mounting plate 86 by a plurality of rods 94 in conventional fashion. The lower ends of rods 94 extend through a plate 96 which is secured to the lower end of tube 66. Nuts 98 secure plate 92 to plate 96. Plate 96 has an opening 100 formed therein which has the power shaft 102 of actuator 78 extending therethrough. Power shaft 102 is retracted and extendable from actuator 78 in conventional fashion. A yoke 106 is secured to the upper end of tube 66. Yoke 106 is secured to the support bar 42 by any convenient means. Although it is preferred that the actuator 78 be of the electrical type, a hydraulically operated actuator could be used.

Figure 6:
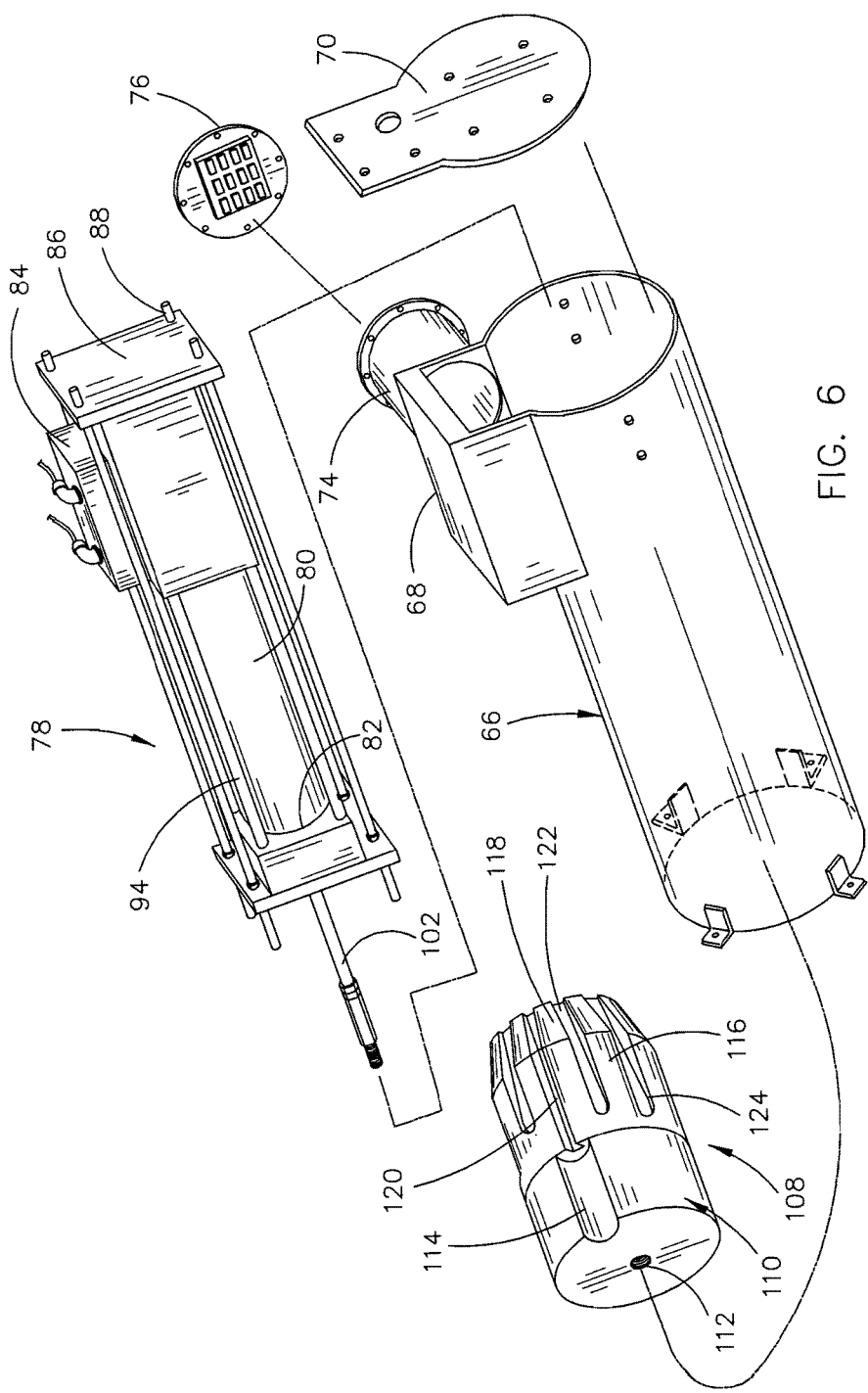
FIG. 6 is an exploded perspective view of the structure associated with the material dispensing valve member of this invention.
Figure 7:
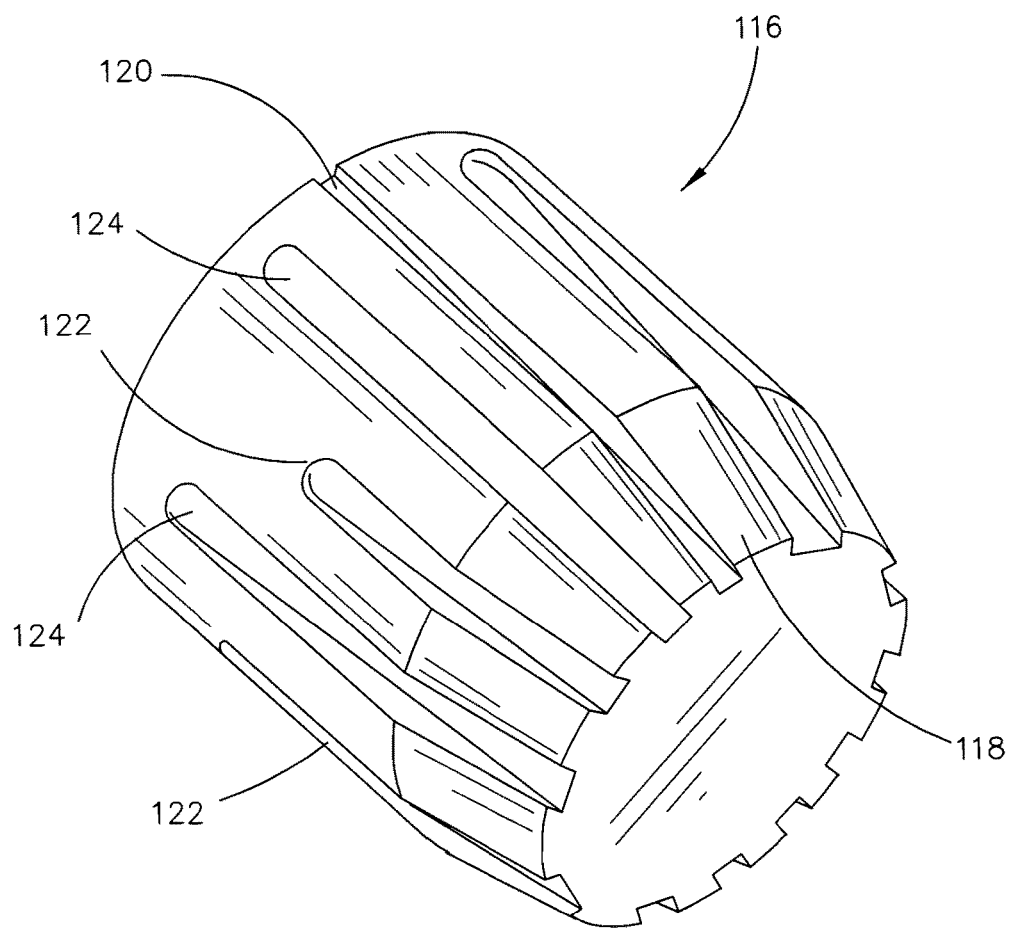
FIG. 7 is a perspective view of the material dispensing valve member of this invention.
Figure 8:
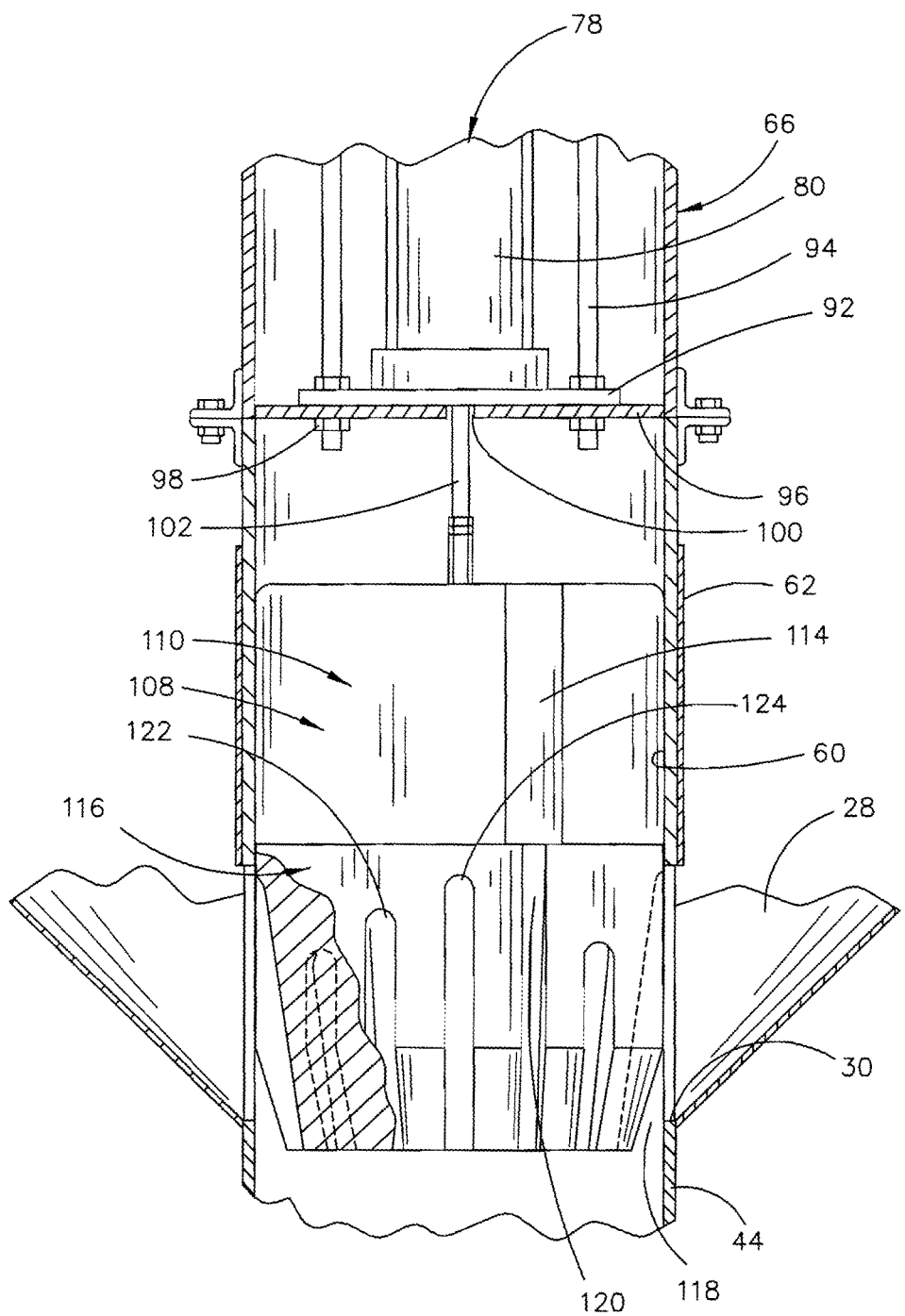
FIG. 8 is a partial sectional view of the material dispensing valve member of this invention and its supporting structure.
Figure 9:
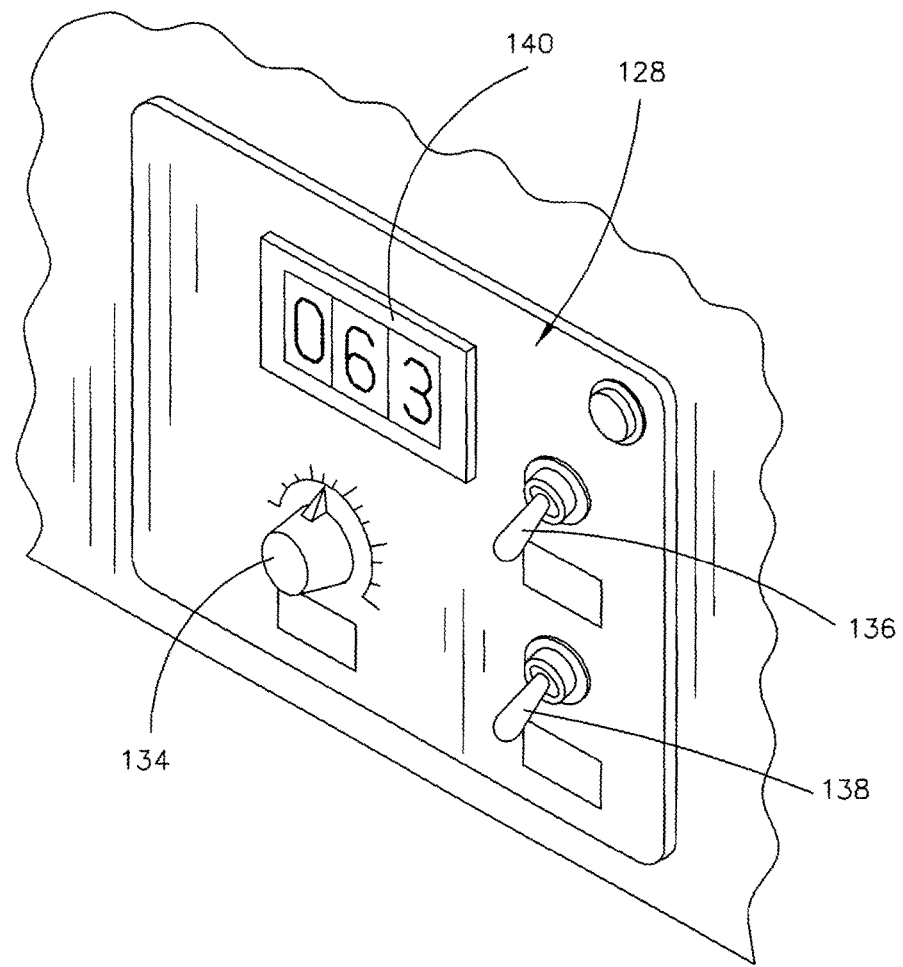
FIG. 9 is a perspective view of the control panel for controlling the material dispensing application of this invention.

The numeral 108 refers to the metering valve assembly of this invention. Valve assembly 108 includes a cylindrical support member 110 which has a threaded opening 112 formed in the upper end thereof. The lower end of power shaft 102 is threadably secured to opening 112. Support member 110 has an anti-rotation slot 114 formed in the side thereof as seen in FIG. 6. Valve assembly 108 includes a valve member 116 which is secured to support member 110 for vertical movement therewith. Valve member 116 includes a tapered lower end 118. Valve member 116 includes an elongated anti-rotation slot 120. Valve member 116 includes a plurality of spaced-apart first slots or grooves 122 formed therein and a plurality of spaced-apart second slots or grooves 124 formed therein. The slots 122 are positioned between the slots 124 and have a shorter length than the slots 124. The depth of the slots 122 and 124 increases from their upper ends to their lower ends. The anti-rotation bar 61 is received in the anti-rotation slots 114 and 120.

Figure 10:
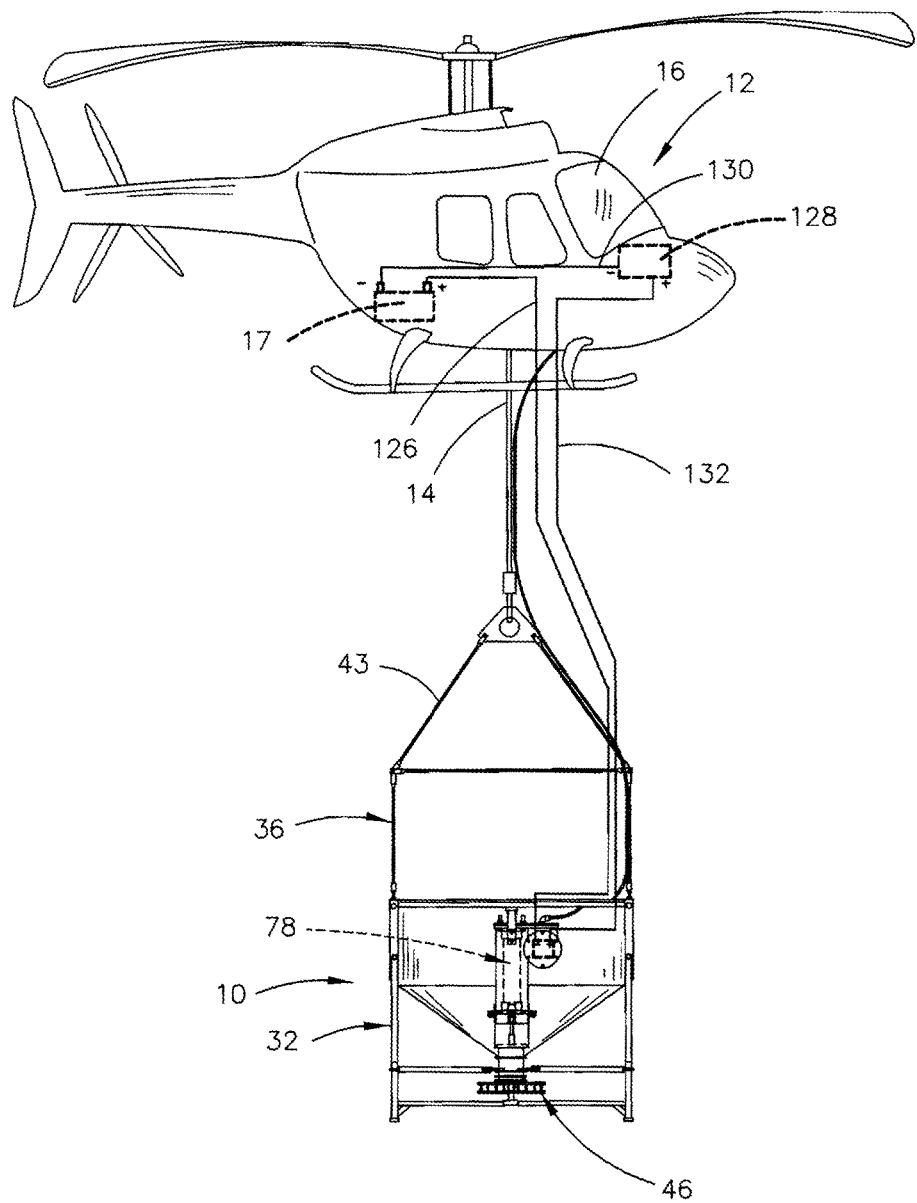
FIG. 10 is a view similar to FIG. 1 but which shows more details of the material spreader apparatus.

As seen in FIG. 10, the actuator 78 is electrically connected to the 12 or 24 volt power source 17 by cable or wire 126. The power source 17 is electrically connected to a control 128 by cable or wire 130. Control 128 is electrically connected to the actuator 78 by cable or wire 132. Control 128 is located within the cockpit 16 of helicopter 12. Control 128 includes a conventional potentiometer or rheostat which is controlled by a rotatable knob 134. Control 128 also includes on-off switches 136 and 138 for extending the power shaft 102 from actuator 78 and for retracting the power shaft into the actuator 78 respectively. The gauge 140 indicates the voltage being supplied to the actuator 78 by way of the potentiometer which indicates to the pilot the position of the valve assembly 108. Other means could be provided for indicating and adjusting the position of the valve assembly 108 from within the cockpit.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A material spreading apparatus for suspension beneath a helicopter having a cockpit and an electrical system, comprising:
   a container, having upper and lower ends, for containing flowable material therein;
   said container having a circular discharge opening at its said lower end through which the material may flow;
   a rotatable material spreader carried by said container for spreading the material which flows through said circular opening at said lower end of said container;
   means carried by said container for operating said rotatable material spreader;
   a vertically disposed valve assembly movably positioned in said discharge opening in said container;
   said valve assembly being selectively movable between an upper position and a lower position and intermediate positions between said upper and lower positions;
   said valve assembly closing said discharge opening when in its said lower position;
   said discharge opening being open when said valve assembly is in said upper position;
   a vertically disposed electrically operated actuator including a body portion having an actuator rod which is movably mounted therein between extended, partially extended and retracted positions;
   said actuator rod being operatively secured to said valve assembly whereby said valve assembly is in its said upper position when said actuator rod is in its said retracted position and whereby said valve assembly is in its said lower position when said actuator rod is in its said extended position and whereby said valve assembly is in one of said intermediate positions when said actuator rod is partially extended; and
   said electrically operated actuator being controlled by the pilot of the helicopter from within the cockpit of the helicopter whereby the pilot of the helicopter may open and close said valve from within the cockpit and may position said valve in partially open positions to selectively vary the flow rate of the material from said discharge opening in said container.

2. A material spreading apparatus for suspension beneath a helicopter having a cockpit and an electrical system, comprising:
   a container, having upper and lower ends, for containing flowable material therein;
   said container having a circular discharge opening at its said lower end through which the material may flow;
   a material spreader carried by said container for spreading the material which flows through said circular opening at said lower end of said container;
   means carried by said container for operating said material spreader;
   a metering valve assembly, having upper and lower ends, including a cylindrical support member having upper and lower ends;
   said metering valve assembly including a valve member moving upper and lower ends which is secured to said lower end of said cylindrical support member for vertical movement therewith;
   said metering valve assembly being configured to selectively decrease the flow of materials therethrough as said metering valve assembly is selectively moved between said upper position to said lower position;
   said metering valve assembly including a valve member, having upper and lower ends;
   said valve member including an upper cylindrical portion, having upper and lower ends;
   said upper end of said cylindrical portion of said valve member being secured to said cylindrical support member;
   said valve member also including an inwardly tapered lower end portion;
   said cylindrical portion at said tapered lower end portion of said valve member having a plurality of radially spaced-apart slots formed therein which have upper and lower ends;
   said upper ends of some of said slots being positioned below the upper ends of some of said slots;
   said slots having an increasing depth from their said upper ends to said lower ends;
   said upper ends of said slots being formed in said upper cylindrical portion of said valve member; and
   said lower ends of said slots being formed in said tapered lower end portion of said valve member.

* * * * *